J. S. WILSON.
APPARATUS FOR VULCANIZING RUBBER ARTICLES AND THE LIKE.
APPLICATION FILED JULY 21, 1909.
1,062,072.
Patented May 20, 1913.
2 SHEETS—SHEET 1.
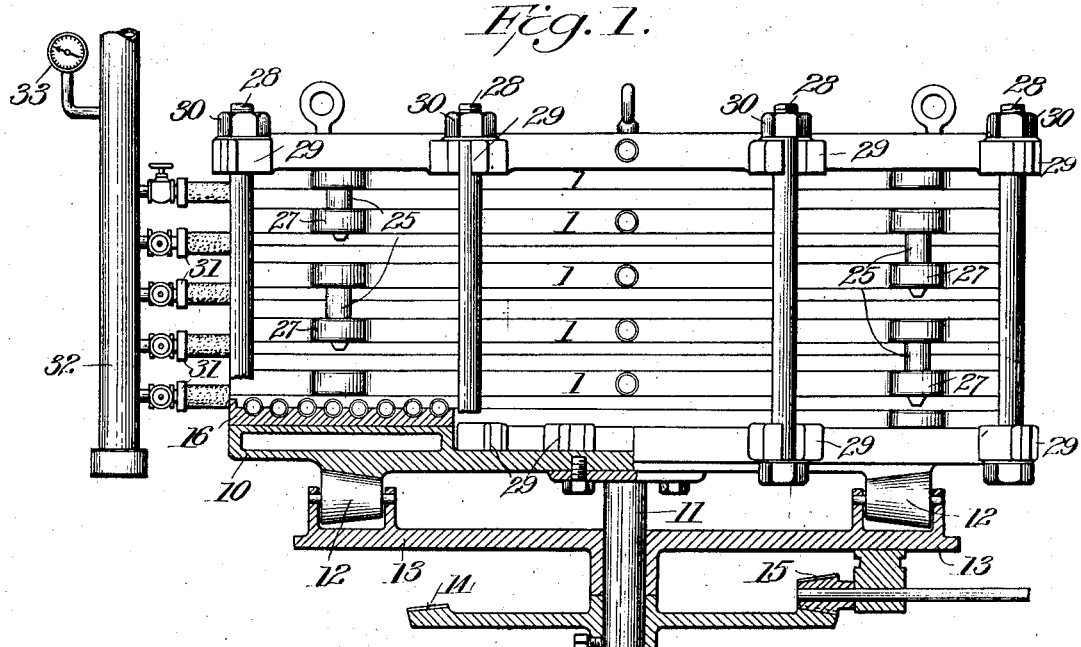
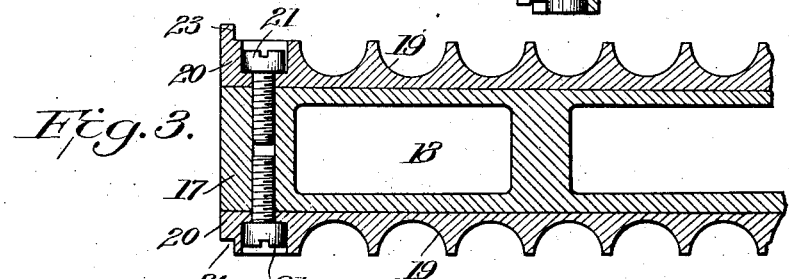
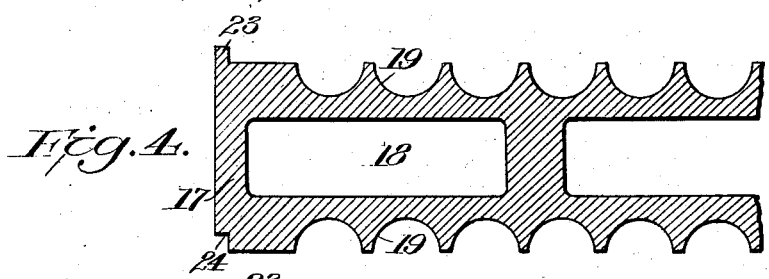
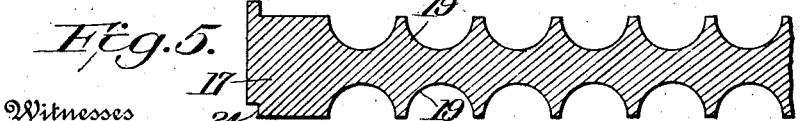

J. S. WILSON.
APPARATUS FOR VULCANIZING RUBBER ARTICLES AND THE LIKE.
APPLICATION FILED JULY 21, 1909.
1,062,072.
Patented May 20, 1913.
2 SHEETS—SHEET 2.
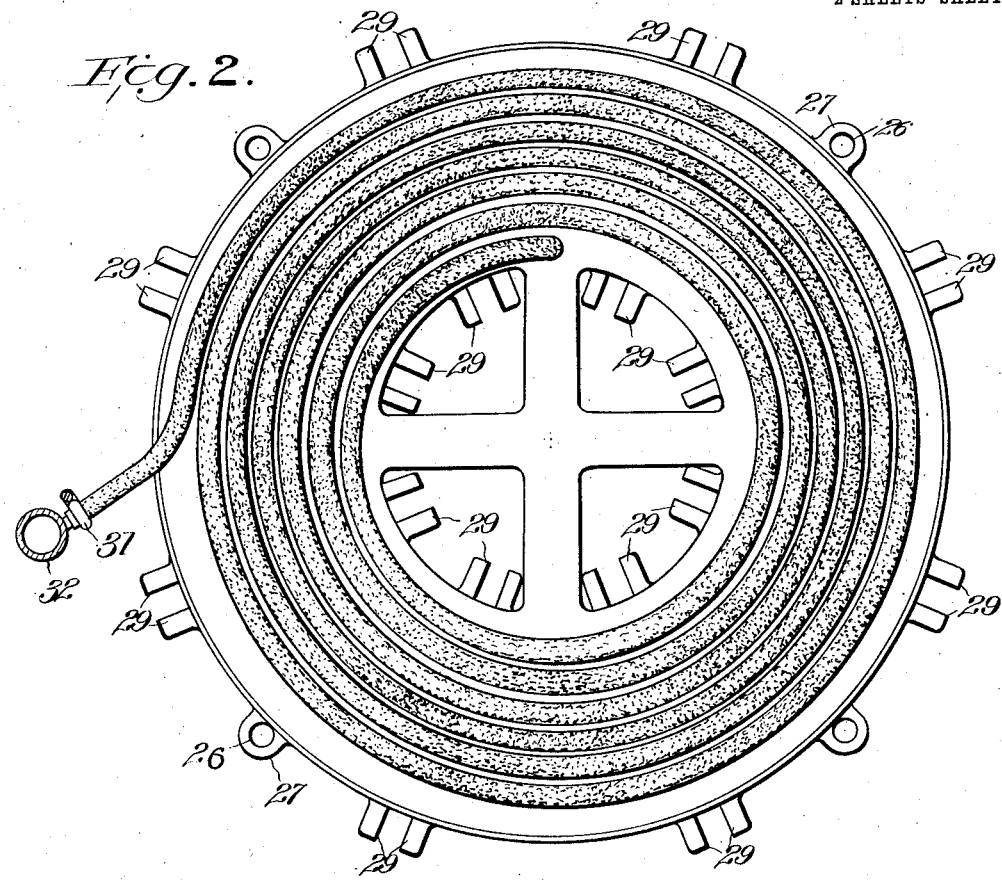
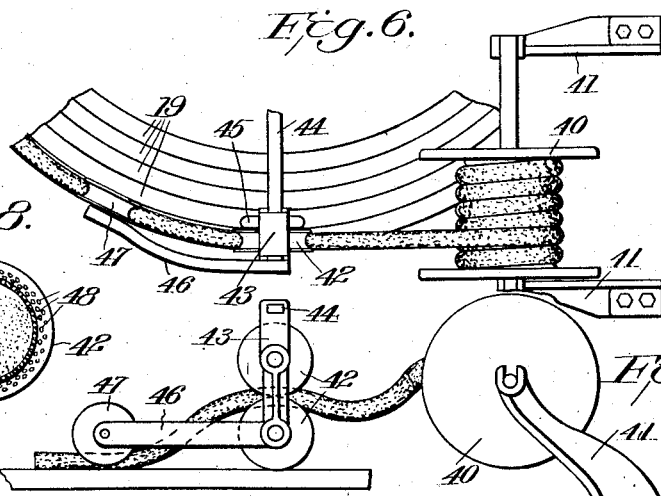

UNITED STATES PATENT OFFICE.

JAMES S. WILSON, OF CHELSEA, MASSACHUSETTS.

APPARATUS FOR VULCANIZING RUBBER ARTICLES AND THE LIKE.

1,062,072. Specification of Letters Patent. Patented May 20, 1913.

Application filed July 21, 1909. Serial No. 508,850.

*To all whom it may concern:*

Be it known that I, JAMES S. WILSON, a citizen of the United States, residing at Chelsea, in the county of Suffolk and State of Massachusetts, have invented certain new and useful Improvements in Apparatus for Vulcanizing Rubber Articles and the Like, of which the following is a specification.

This invention relates to certain new and useful improvements in apparatus for vulcanizing rubber articles and the like.

The object of the invention is to provide improved means for readily vulcanizing rubber articles constructed in great lengths or sections.

A further object is to provide an improved vulcanizing apparatus constructed of a plurality of separate sections capable of use independently, or in stacks.

A further object is to provide a mold with means whereby the same may be readily changed or adapted to work of different shapes or diameters.

A further object is to provide improved means for feeding the green or unvulcanized article to the mold prior to the vulcanizing operation.

The invention will be hereinafter fully set forth and particularly pointed out in the claims.

In the accompanying drawings:—Figure 1 is a side elevation illustrating a plurality of molds assembled in a stack for the vulcanizing process, parts being broken away and shown in section. Fig. 2 is a plan view of one of the mold sections illustrating the article in position to be vulcanized. Fig. 3 is a transverse sectional view of one of the mold sections. Fig. 4 is a similar view of a slight modification. Fig. 5 is a similar view of a second modification. Fig. 6 is an enlarged plan view illustrating the feeding device. Fig. 7 is a side elevation thereof. Fig. 8 is a detail.

Referring to the drawings 10 designates a table or platform secured to a shaft 11 and supported adjacent its periphery by suitable antifriction devices 12 mounted upon arms 13. The shaft 11 is provided with a beveled gear 14 driven by a pinion 15 receiving power from any suitable source.

The table 10 is constructed to support a mold 16, or if desired a plurality of said molds may be built up one upon the other to form a stack, as shown in Fig. 1. Each mold consists of a body 17, preferably circular in contour, and provided with an interior heating chamber 18 receiving steam, or other heating medium from any suitable source. In each face of the mold is formed a continuous spiral channel 19 as clearly illustrated in Fig. 2. In Fig. 4 these channels are shown as cast integral into the mold body. In Fig. 3 said channels are shown as formed in plates 20 which are removably secured to the body of the mold by means of screws 21 or other preferred securing devices. By employing these removable plates 20 channels of different form may be readily substituted one for the other upon the same jacketed mold body to conform to the size and contour of the article to be vulcanized. In Fig. 5 the mold is shown without the heating chamber, this form being adapted to be placed in an ordinary vulcanizing device of any suitable or preferred construction. In order to bring the superposed mold sections in juxtaposition when placed one upon the other, I provide each mold section with projecting lugs 23 arranged to enter complemental recesses 24 in the contiguous edge of the next adjacent section. Each section is also provided with lugs carrying guide pins 25, which engage holes 26 formed in lugs 27, the lugs carrying the pins and holes being arranged alternately. The pins of one section fit within the holes of the next adjacent section, thereby holding the sections in proper relative position. When the several mold sections have been placed one upon the other they are locked together by means of rods 28 engaging lugs 29 carried by each section, pressure being applied by tightening the nuts 30 carried by said rods. In the drawings I have illustrated the apparatus as in the act of vulcanizing rubber hose, but it is obvious that the invention is not limited to this class of articles. As shown each section of hose carried by the various mold sections is coupled at 31 with a fluid or other pressure device 32 by means of which an internal pressure within the mold is created during the vulcanizing process. Said pressure device is provided with a suitable pressure gage 33. By means of this internal pressure the rubber is forced outwardly to completely fill the mold, and where fabric is employed in connection with the rubber, the two materials are forced together to form a homogeneous mass which becomes permanently inseparable.

The green or unvulcanized article may be placed in the spiral channels 19 in any suitable manner. I have illustrated, however, a feeding device comprising a reel 40 mounted in suitable arms 41 and adapted to receive the unvulcanized article. Said article, which as before stated is illustrated as a hose or tube, passes between upper and lower feeding rolls 42, mounted in a suitable carriage 43, carried by a shaft 44 arranged diametrically across the mold. Said carriage is provided with a guide wheel 45 adapted to fit within the channel 19, and extending rearwardly from said carriage is a bracket 46 which supports a placing wheel 47. The wheel 45 rests within the course of the channel 19 next adjacent the course in which the wheel 47 is placing the hose. In order to prevent the unvulcanized material from adhering to the feeding rolls 42 and the placing wheel 47, the latter are made hollow to receive talc which is sprinkled over the material through suitable perforations 48 in the peripheries.

In practice the unvulcanized article having been previously wound upon the reel 40 in any suitable or preferred manner, the guide wheel 45 is placed within the channel 19 and the end of the article brought into position in the outer course of said channel. As the table 10 is rotated the traction of wheel 45 rotates the feed wheels 42 thereby feeding the article from the reel 40 and permitting the wheel 47 to place the same in the channel, the said reel being arranged to reciprocate back and forth to deliver the hose in line with the channel. When the desired length has been placed in position a second mold may be placed over the first in the manner heretofore described, the channel 19 on the underside of the latter registering with the corresponding channel in the top face of the first section. After the desired number have been superposed one upon the other the sections of the stack are locked together and the connections made with the fluid pressure. At the same time the heating medium is directed to the interior of the molds. After the required time has elapsed the molds are separated and the foregoing operation repeated, as desired. After the vulcanizing process, the vulcanized article is removed from the mold, commencing with the end located in the outer course of the channel. After two or three of the courses of said channel have been emptied, the feeding wheels 42 may be operated to place a new article in the mold simultaneously with the removal of the remainder of the vulcanized article. It is obvious that while I have shown and described the mold sections as arranged in a stack, the same may if desired be used individually without departing from the spirit of my invention. It is also obvious that the stack may be made up of mold sections adapted to different styles, sizes and contours.

It will be noted that the channel faces of my improved mold sections are so constructed that in the event of injury to any of said faces, the channels may be readily recut or dressed down by any of the well known machines or apparatus adapted to such work.

I claim as my invention:—

1. A vulcanizing apparatus comprising two mold sections, each formed upon its face with a continuous coiled channel, the channel of the two sections when the two sections are assembled, forming a continuous coiled chamber to hold the article to be vulcanized, a steam chamber or chambers formed in each of said sections, a feeding device comprising a reel and carriage, feeding rolls mounted thereon, a guide wheel mounted in said carriage engaging one of said mold sections, an arm projecting from said carriage, and a placing roll mounted in said arm.

2. In a vulcanizing apparatus, the combination with a vulcanizing mold provided with a spiral channel of a feeding device comprising a reel, a carriage, feeding rolls mounted therein, and a guide wheel mounted in said carriage and engaging said channel.

3. In a vulcanizing apparatus, the combination with a vulcanizing mold provided with a spiral channel of a feeding device comprising a reel, a carriage, feeding rolls mounted therein, a guide wheel mounted in said carriage and engaging one course of said channel, and a placing roll mounted in said carriage and located adjacent a contiguous course in said channel.

4. In a vulcanizing apparatus, the combination with a vulcanizing mold, of a feeding device comprising a reel, a carriage, feeding rolls mounted therein, and a guide wheel mounted in said carriage and engaging said mold, said feeding rolls being hollow to receive talc or the like and provided with perforated peripheries whereby the unvulcanized material is prevented from adhering to said rolls.

In testimony whereof I hereto affix my signature in presence of two witnesses.

JAMES S. WILSON.

Witnesses:
  Wm. S. Hodges,
  M. E. Smith.